United States Patent
Oberle et al.

(10) Patent No.: US 10,764,430 B2
(45) Date of Patent: Sep. 1, 2020

(54) CALLING AN UNREADY TERMINAL

(71) Applicant: Microsoft Technology Licensing, LLC, Redmond, WA (US)

(72) Inventors: Vincent Marc Oberle, Tallinn (EE); Carl S. Olivier, Esher (GB); Mateusz Tomaszewski, Bedford (GB); Vasiliki Gkiza, San Francisco, CA (US); Mabel Wing Ling Wong, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/991,410

(22) Filed: Jan. 8, 2016

(65) Prior Publication Data
US 2016/0234383 A1 Aug. 11, 2016

Related U.S. Application Data

(63) Continuation of application No. 13/659,773, filed on Oct. 24, 2012, now Pat. No. 9,258,172.

(51) Int. Cl.
*H04M 3/42* (2006.01)
*H04L 5/00* (2006.01)
(Continued)

(52) U.S. Cl.
CPC .......... *H04M 3/42195* (2013.01); *G06F 8/61* (2013.01); *H04L 29/0638* (2013.01);
(Continued)

(58) Field of Classification Search
CPC ......... H04M 2215/62; H04M 2215/64; H04M 3/48; H04M 15/56; H04M 7/006
(Continued)

(56) References Cited

U.S. PATENT DOCUMENTS 4,390,944 A   6/1983   Quackenbush et al.
6,775,365 B1  8/2004   Norby
(Continued)

FOREIGN PATENT DOCUMENTS

CN   1622568 A    6/2005
EP   1324580 A2   7/2003
(Continued)

OTHER PUBLICATIONS

"Final Office Action", U.S. Appl. No. 13/659,773, dated Jun. 27, 2014, 22 pages.
(Continued)

*Primary Examiner* — Khaled M Kassim
*Assistant Examiner* — Jason A Harley
(74) *Attorney, Agent, or Firm* — Schwegman Lundberg & Woessner, P.A.

(57) ABSTRACT

A voice or video call is to be established between a caller and a callee based on a call flow that involves a call establishment request and a corresponding call acceptance response. A first call establishment request is sent to a called terminal (of the callee) that is unready to accept the call upon receiving this first call establishment request. Once the called terminal is ready to accept the call, instead of the call acceptance response, a reverse call establishment request for the call is received back from the called terminal. The reverse call establishment request is automatically accepted on behalf of the caller on condition that the reverse call establishment request was received back from the called terminal within a certain time limit. If so, the call is accepted by sending an instance of the call acceptance response to called terminal.

22 Claims, 4 Drawing Sheets

(51) Int. Cl.
*G06F 7/00* (2006.01)
*H04L 29/06* (2006.01)
*H04M 3/48* (2006.01)
*H04M 7/00* (2006.01)
*G06F 8/61* (2018.01)
*H04L 29/08* (2006.01)

(52) U.S. Cl.
CPC .............. *H04L 67/10* (2013.01); *H04L 67/26* (2013.01); *H04M 3/42068* (2013.01); *H04M 3/42374* (2013.01); *H04M 3/48* (2013.01); *H04M 7/006* (2013.01); *H04M 3/42178* (2013.01); *H04M 2201/14* (2013.01)

(58) Field of Classification Search
USPC .......................................................... 455/416
See application file for complete search history.

(56) References Cited

U.S. PATENT DOCUMENTS

| | | | |
|---|---|---|---|
| 9,258,172 | B2 | 2/2016 | Oberle et al. |
| 2004/0029561 | A1* | 2/2004 | Holter .................. H04M 15/00 455/405 |
| 2004/0081098 | A1 | 4/2004 | Sakai |
| 2004/0109418 | A1 | 6/2004 | Fedorkow et al. |
| 2004/0190500 | A1 | 9/2004 | Wratten |
| 2005/0014490 | A1* | 1/2005 | Desai .................. H04M 3/5307 455/416 |
| 2006/0209856 | A1* | 9/2006 | Tojo .................. H04L 29/06027 370/401 |
| 2008/0182548 | A1* | 7/2008 | Pattison .................. H04L 69/08 455/406 |
| 2009/0109941 | A1* | 4/2009 | Carter .................... H04W 8/18 370/338 |
| 2009/0186582 | A1 | 7/2009 | Muhammad et al. |
| 2010/0203875 | A1* | 8/2010 | Nishimori ........... H04L 65/4061 455/416 |
| 2010/0246785 | A1 | 9/2010 | Wang et al. |
| 2010/0273455 | A1* | 10/2010 | Tamura ................... H04L 51/14 455/412.1 |
| 2011/0111743 | A1* | 5/2011 | Boukai ................... H04W 4/00 455/419 |
| 2011/0249668 | A1* | 10/2011 | Van Milligan .......... G06F 9/485 370/352 |
| 2012/0250585 | A1* | 10/2012 | Seetharaman ........ H04M 15/08 370/259 |
| 2013/0343246 | A1* | 12/2013 | Manyakin, Jr. ..... H04M 7/0075 370/310 |
| 2014/0112333 | A1 | 4/2014 | Oberle et al. |

FOREIGN PATENT DOCUMENTS

| | | |
|---|---|---|
| EP | 1689153 | 8/2006 |
| KR | 20090006872 A | 1/2009 |

OTHER PUBLICATIONS

"International Search Report and Written Opinion", Application No. PCT/US2013/065787, dated Jan. 23, 2014, 11 pages.
"Non-Final Office Action", U.S. Appl. No. 13/659,773, dated Feb. 27, 2015, 30 pages.
"Non-Final Office Action", U.S. Appl. No. 13/659,773, dated Dec. 19, 2013, 23 pages.
"Notice of Allowance", U.S. Appl. No. 13/659,773, dated Oct. 9, 2015, 15 pages.
"First Office Action and Search Report Issued in Chinese Patent Application No. 201380055909.0", dated Nov. 11, 2016, 18 Pages.
"Foreign Office Action", CN Application No. 201380055909.0, dated May 15, 2017, 10 pages.
"Office Action Issued in Japanese Patent Application No. 2015-539681", dated Dec. 5, 2017, 10 Pages.
"Office Action Issued in Korean Patent Application No. 10-2015-7010580", dated Dec. 20, 2019, 6 Pages.
"Notice of Allowance Issued in Korean Patent Application No. 10-2015-7010580", dated May 19, 2020, 4 Pages.

* cited by examiner

CALLING AN UNREADY TERMINAL

RELATED APPLICATIONS

This application is a continuation of U.S. patent application Ser. No. 13/659,773, filed Oct. 24, 2012, entitled "Calling an Unready Terminal", the disclosure of which is hereby incorporated by reference herein in its entirety.

BACKGROUND

Various types of communications can be implemented over a packet-switched network such as the Internet, including packet-based voice or video calling such as Voice over IP (VoIP), and text based communications such as instant messaging (IM) chat sessions. Various communication systems also exist each using one or more of the different types of communication. For example one communication system may provide VoIP or both VoIP and IM, whereas another system may provide only IM or may only provide VoIP according to a different incompatible protocol.

Each different communication system implemented over the network has its own respective set of users (its user base), identified by a respective system of user names or other such user identifiers. Each different communication system provides a respective client application to be installed on the user terminals of the users of its respective user base, allowing those users to access the communication system. For example a user may install an instance of the client application of a first communication system, e.g. providing VoIP or VoIP and IM, on his or her user terminal, and register with the first communication system so as to obtain a user name or other identifier uniquely identifying him or her within the first communication system. The user can then gain access to the first communication system based on this unique identifier (potentially as well as other credentials such as a password or authentication certificate), allowing him to communicate with other users identified based on their user names or identifiers if they have agreed to become contacts of the user in question. Similarly a user may install an instance of the client of a second communication system, e.g. providing only IM, on his or her user terminal, and register with the second communication system so as to obtain a user name or other identifier uniquely identifying him or her within the second communication system. The user can then gain access based on this unique identifier (again potentially as well as other credentials such as a password or authentication certificate) and thus communicate with contacts using the second communication system.

A user may register with two or more different communication systems, and have a respective user name or identifier for each. A user who has registered with a communication system to obtain a user name or other identifier is said to have an account with that communication system (which need not necessarily be an account in a financial or monetary sense as many communication systems can be free). Nowadays it is also possible to link together the accounts of different communication systems. E.g. the user of a first communication system may also have an account with a second communication system and may have those accounts linked so that contacts from the second communication system are visible to the client of the first communication system. The user may then be able to use the client of the first communication system to communicate with a contact via that contact's client of the second communication system.

In such a scenario the user of one system, e.g. VoIP system, may attempt to call another user who does not have a client that is capable of processing the relevant communication type, e.g. does not have a VoIP capable client installed because he or she is currently only an IM user. In this case the called user (the callee) may be provided with the option of downloading and installing an instance of VoIP application in order to be able to take the call, e.g. installing a plug-in application which plugs in to his or her web browser. In the meantime the originating user (the caller) is just presented with a message saying the callee is having to install a new plug-in and will call back once installation is complete.

Generally there may also be other reasons why the terminal of a callee is not ready to accept an incoming call.

SUMMARY

According to the disclosure herein a voice or video call is to be established between a caller and a callee based on a call flow that involves a call establishment request and a corresponding call acceptance response. For example this could be a VoIP call, or other packet-based voice or video call over a packet-switched network. A first call establishment request is sent to a called terminal (a user terminal of the callee) that is unready to accept the call at the time of receiving this first call establishment request. For example the called terminal may have to download and/or install a supplemental VoIP application such as a plug-in before it can conduct the call, or may need to wake up from a background state.

Once the called terminal is ready to accept the call however, instead of the call acceptance response, a reverse call establishment request for the call is received back from the called terminal. To handle this, a suitably configured calling engine is provided which may be implemented at the calling terminal (a user terminal of the caller). This calling engine is configured to automatically accept the reverse call establishment request on behalf of the caller, but on condition that the reverse call establishment request was received back from the called terminal within a certain time limit. If so, the call is accepted by sending an instance of the call acceptance response to called terminal. The call can then be conducted over the relevant network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted in the Background section.

BRIEF DESCRIPTION OF THE DRAWINGS

For a better understanding of the present disclosure and to show how in embodiments it may be put into effect, reference is made by way of example to the accompanying drawings in which.

DETAILED DESCRIPTION

Figure 1:
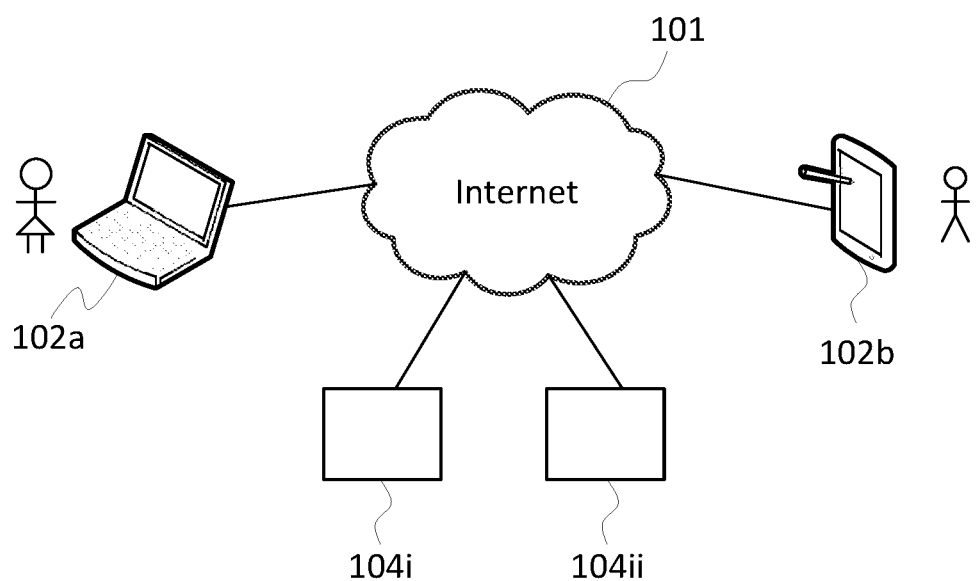
FIG. 1 is a schematic representation of a communication network.

Embodiments of the present disclosure relate to a first communication system implemented over a packet-based network such as the Internet based on a first user base and a first communication client application which provides access to voice and/or video calling as well as IM chat, and to a second communication system implemented over the packet-based network based on a second user base and a second communication client application which in itself only provides access to IM chat (or at least does not in itself provide access to voice or video calling, or does not in itself provide access to voice or video calling that is compatible with the first communication system). In embodiments the second, IM-only system may be thought of as a legacy IM system and the second, IM-only client may be thought of as a legacy IM client (as opposed to the first communication system and first client which handle both VoIP and IM).

In the case where a first client calls an end point that is not able to immediately accept a call because, for example, a plug in needs to be downloaded at the far end, or the far end client is backgrounded, then the far end client will send a reverse call establishment request in response to receiving a call request from the first client. When the reverse call request is received at the first client, the call is automatically accepted if the reverse call request message is received within a predetermined time, so that the credential check and download occur during the call set up flow initiated by the original caller.

In embodiments legacy IM users will be induced to upgrade to the VoIP client, which may become the main consumer rich communication application. Once the social center of the network moves, the IM world will de facto lose audio-video capabilities with these hub contacts. That may lead to the collapse of the remaining network, possible unnecessary churn or lower rate of migration (as it may be perceived to be inferior until all users move). An integration service can help limit the downside and accelerate migration to the first, VoIP communication system. This may be done by providing a web based calling experience that allows migrated users to call legacy IM users.

The integration service may enable previously non-VoIP users, or users who were not previously users of the first communication system, to make video and audio calls using their browsers together with a plugin. This experience may encourage user to download and use the full client. Users of existing VoIP clients may also have contacts on the IM system messaging client whom they want to talk to. At a high level, if a VoIP user (inviter or caller) sees a contact is online, then, given certain conditions, he or she should be able to start a video call with the contact. If the contact (the invitee or callee) doesn't have a suitable VoIP client active, then that contact can be sent a URL which will trigger the download and install the plugin that will allow him or her to make the call using the web browser.

FIG. 1 provides a schematic representation of a packet-switched network 101 over which the first and second communication system may be implemented, in embodiments a wide area internetwork such as the Internet. The network 101 comprises an infrastructure of the first communication system comprising one or more first servers 104*i*, and an infrastructure of the second communication system comprising one or more second servers 104*ii*. Also connected to the network 101 are a plurality of user terminals including a first user terminal 102*a* and a second user terminal 102*b*. Each user terminal may for example take the form of a desktop computer, or a mobile user terminal such as a mobile phone, tablet or laptop computer. A tablet and laptop are shown in FIG. 1 but this is for illustrative purposes and each could be any kind of user terminal. For the purpose of the following examples, the first user terminal 102*a* will be the calling terminal (of the caller) and the second user terminal 102*b* will be the called terminal (of the caller).

Figure 2:
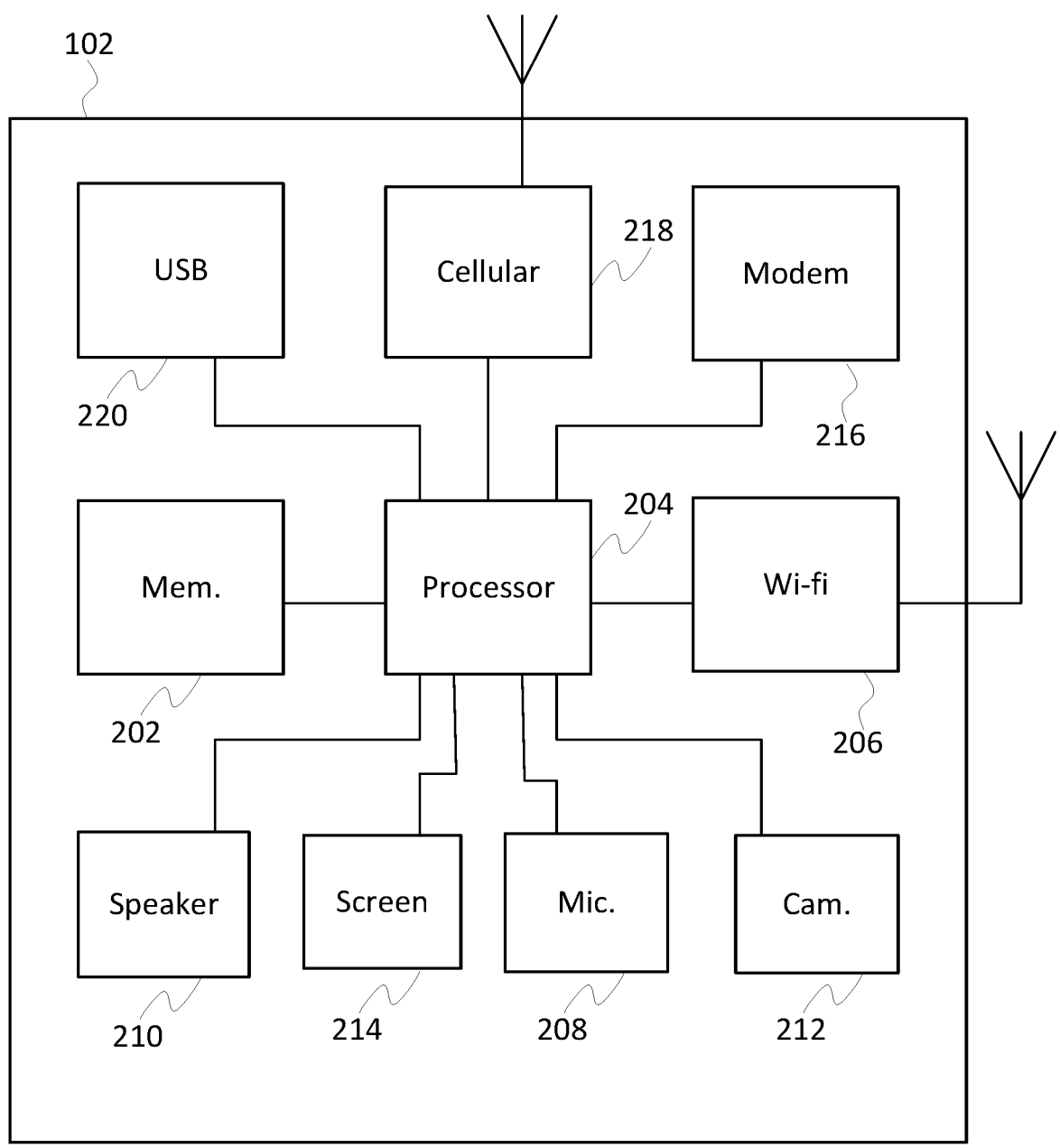
FIG. 2 is a schematic block diagram of a user terminal.

FIG. 2 gives a schematic block diagram of a user terminal 102 showing components that may be found in the first and second user terminals 102*a*, 102*b*. The user terminal 102 comprises processing apparatus in the form of a processor 204 comprising one or more execution units, and storage in the form of a memory 202 comprising one or more storage media such as an electronic storage medium and/or magnetic storage medium. The user terminal 102 also comprises a plurality of input and/or output (I/O) devices such as a microphone 208, speaker 210, video camera 214 and/or screen 214, each of which may be either internal or external to the terminal 102. Further, the user terminal 102 comprises one or more transceiver devices for communicating over the packet-switched network 101 with other user terminals 102 and with servers 104*i*, 104*ii* of the first and second communication systems. The one or more transceiver devices may comprise one or more: of a wi-fi or other short-range local transceiver 208 for connecting to the network 101 via a wireless router wireless access point of a wireless local area network, an internal modem 216 for connecting to the network 101 via a wired connection such as a telephone landline or cable connection, a cellular transceiver such as a 3GPP transceiver for connecting to the network 101 via a cellular base station (sometimes called a node B), and/or a USB interface or other external interface for connecting to the network 101 via an external modem. Each of the memory 202, the I/O devices 208, 210, 212, 214 and the one or more transceivers 206, 216, 218, 220 is operatively coupled to the processor 204.

The memory 202 stores computer-readable code arranged to be executed on the processor 204 including an operating system and one or more applications which run under control of the operating system, typically being scheduled by the operating system for execution. On each of the first and second terminals 102*a*, 102*b*, the respective memory 202 comprises at least one communication client for communicating with other user terminals using a communication system implemented over the packet-switched network 101, e.g. over the Internet.

Figure 3:
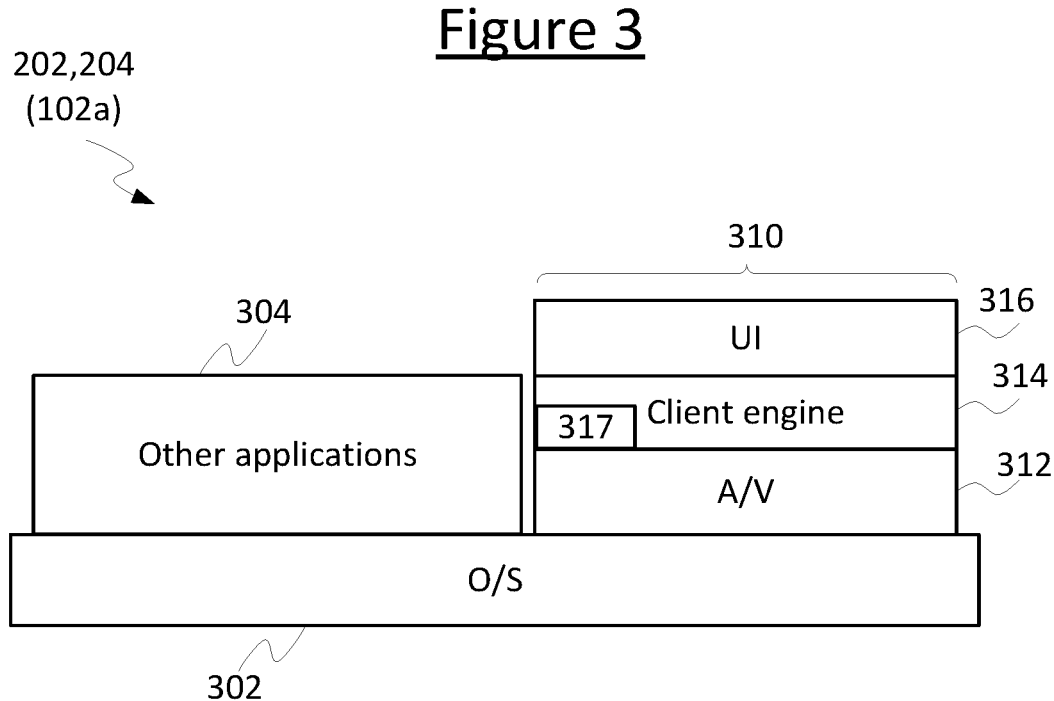
FIG. 3 is a schematic block diagram of showing elements of a caller's user terminal.

FIG. 3 provides a schematic illustration of the operating system and applications arranged to run on the first user terminal 102*a*. The first terminal 102*a* comprises an operating system 302, and running under control of the operating system 302: an instance of the first client application 310 being the communication client application of the first communication system, and optionally one or more other applications 304 such as a web browser, email client and/or video game. The applications 304, 310 may be scheduled for execution on the processor 204 of the first terminal 102*a* by the operating system 302, e.g. a plurality of the applications being scheduled to execute in parallel such as in an interleaved fashion and/or using different threads or execution units of the processor.

The first client 310 comprises a user interface (UI) layer 316, a client engine 314, and an audio and/or video (A/V) layer for performing voice and or video encoding and transmission over the packet-switched network 101, e.g.

encoding using a suitable encoding standard such as H263 or H264 and packaging the encoded video for transmission using a suitable packet-based method such as VoIP. The client engine 314 comprises at least a calling engine responsible for performing call set-up signalling for establishing a call with another user terminal using the first communication system. The calling engine is configured with a call set up protocol which defines a call flow for a given call establishment event, involving two distinct types of message, a call establishment request and a corresponding call acceptance response.

Using the client engine 314 and A/V layer 312, the first client 310 executed on the first user terminal 102a is thus able to conduct calls with clients on other user terminals using the first communication system, e.g. VoIP system, via one of the transceivers 206, 216,218,220 of the first terminal 102a and packet-switched network 101. That is, to conduct live, real-time phone calls. The following will be described in terms of VoIP, but it will be understood that this is only exemplary.

In embodiments if the first client 310 also enabled for IM as well as voice and video calls, the client engine may also comprise a protocol for IM signalling using the first communication system (not necessarily compatible with the IM of the second communication system, though it may be).

Further, the client engine 314 of the first, VoIP client 310 comprises a timer 317, the function of which will be described in more detail below.

Figure 4:
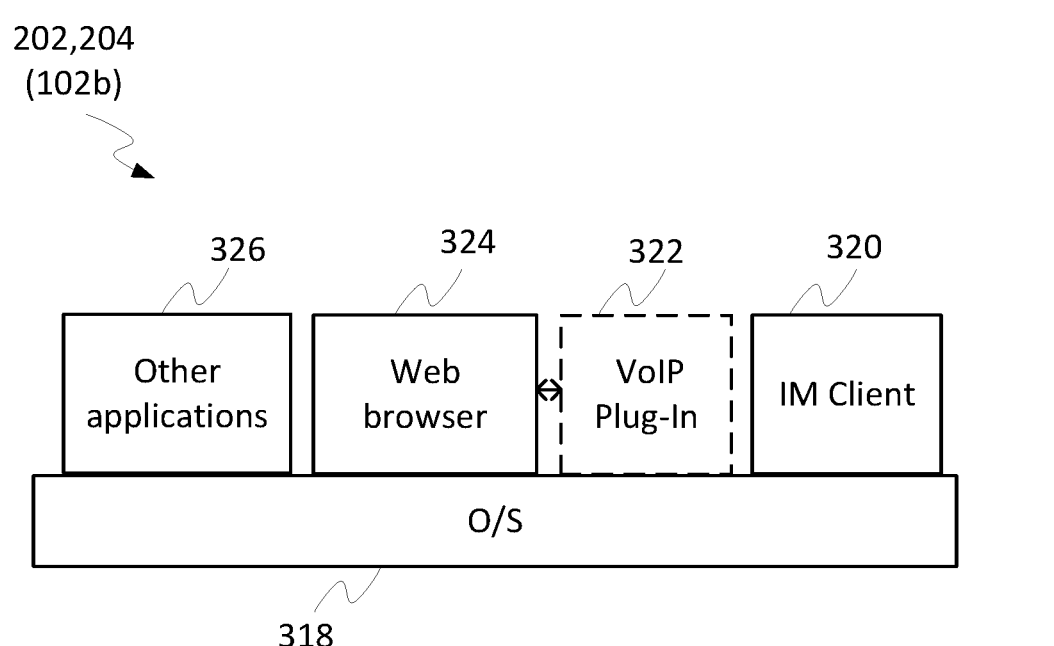
FIG. 4 is a schematic block diagram showing elements of a callee's user terminal.

FIG. 4 provides a schematic illustration of the operating system and applications arranged to run on the second user terminal 102b. The second terminal 102b comprises an operating system 318, and running under control of the operating system 318: an instance of the second client application 320 being the commination client application of the second communication system, and optionally a web browser 324, a supplemental VoIP application such as a VoIP plug-in and/or one or more other applications 326 such as an email client and/or video game. The applications 320, 322, 324, 326 may be scheduled for execution on the processor 204 of the second terminal 102b by the operating system 318, e.g. a plurality of the applications being scheduled to execute in parallel such as in an interleaved fashion and/or using different threads or execution units of the processor.

When executed on the processor 204 of the second user terminal 102b, the second client is able to perform communications other than live calls, such as IM chat sessions, with other user terminals over the second communication system, e.g. legacy IM system, via one of the transceivers 206, 216,218,220 of the second user terminal 102b and packet-switched network 101. The following will be described in terms of IM but it will be understood this is only exemplary.

The supplemental VoIP application 322 may not initially be present or active, but may instead be downloaded and/or installed in response to an incoming call request from the first terminal 102a. The supplemental VoIP application 322 also comprises calling engine and A/V layer compatible with those of the first client 310 and, when installed and executed on the second user terminal 102b, is thus able to conduct one or more live voice or video calls with clients on other user terminals using the first communication system via their respective transceivers and the packet-switched network 101. This includes at least a live voice or video call with the first client 310 on the first terminal 102a, though in embodiments the supplementary VoIP client 322 is also configured to allow the user of the second terminal 102b to make calls with other users of other terminals so that after the installation triggered by the incoming call this user and his or her user terminal 102b are now integrated into the first, VoIP communication system in addition to (or even in place of) the second communication system. In embodiments the supplemental VoIP application 322 is provided as a plug-in to another of the applications on the second terminal 102b such as the web browser 224, although a stand alone application is also a possibility. The following will be described in terms of a plug-in to the web browser 324, but it will be understood this is only exemplary.

Figure 5:
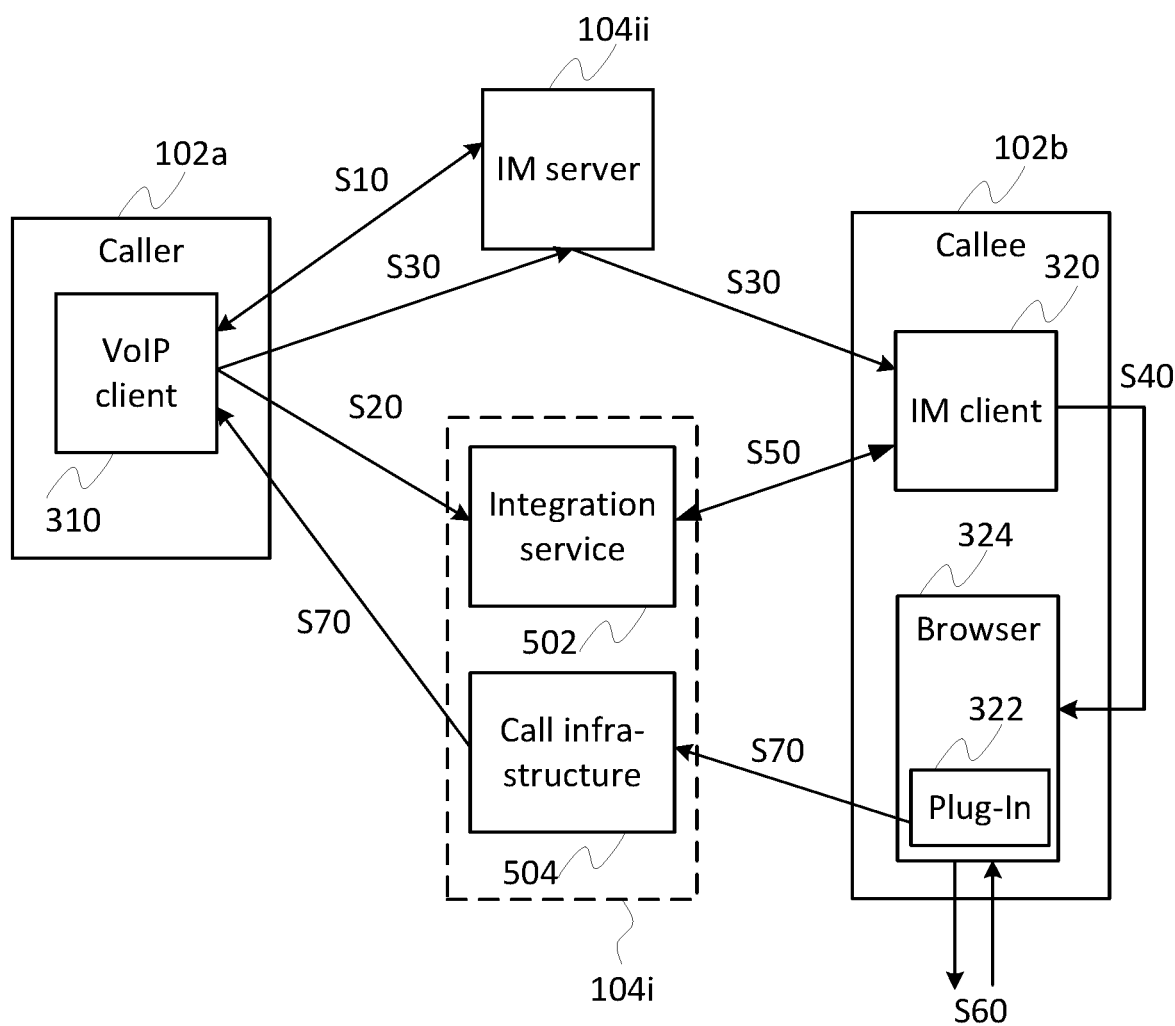
FIG. 5 is a schematic block diagram showing elements of two linked communication systems implemented over a communication network, including a schematic representation of an associated call flow.

Reference is now made to FIG. 5 which gives a schematic block diagram of various elements involved in the integration between the first and second communication systems, and also schematically illustrates a corresponding call flow associated with those components.

The infrastructure of the first communication system comprises an integration service 502 which may be implemented on one or more servers 104i of the first communication system, and a call infrastructure 504 which in embodiments may also be implemented in on one or more servers 104i of the first communication system. In an alternative embodiment the call infrastructure may be implemented as a peer-to-peer infrastructure distributed amongst a plurality of other user terminals 102, or as a mix of server based and peer-to-peer topologies. However as an exemplary embodiment the following will be described in terms of a wholly server based topology for the call infrastructure 504.

Each of the integration service 502 and call infrastructure 504 is operatively coupled to the client engine 314 of the first, VoIP client 310 on the first user terminal 102a via the packet-switched network 102 and one of the transceivers 206, 216, 218, 220 of the first user terminal 102a. The integration service 502 is operatively coupled to the second, legacy IM client 320 on the second user terminal 102b via the packet-switched network 101 and one of the transceivers 206, 216, 218, 220 of the second user terminal 102b. The call infrastructure 504 is operatively coupled to the VoIP plug-in 322 on the second user terminal 102b, when installed, via the packet-switched network 102 and one of the transceivers 206, 216, 218, 220 of the second user terminal 102b.

The infrastructure of the second communication system comprises a legacy IM server system implemented in one or more servers 104ii of the second communication system. The legacy IM server system is operatively coupled to the client engine 314 of the first, VoIP client 310 on the first user terminal 102a via the packet-switched network 101 and one of the transceivers 206, 216, 218, 220 of the first user terminal 102a; and to the second, legacy IM client 320 on the second user terminal 102b via the packet-switched network 102 and one of the transceivers 206, 216, 218, 220 of the second user terminal 102b.

The operations which these elements may be configured to perform are now described by way of example with reference to steps S10 to S70 illustrated schematically in FIG. 5.

At the beginning of step S10 the callee is logged in to the first, VoIP client 310 on the first user terminal 102a, e.g. running on the desktop of the operating system 302. The callee may be logged in with his or her credentials of the first, VoIP communication system, comprising his or her user name or other user identifier of the first communication system (and any other credentials such as password).

The callee has his or her account with the VoIP communication system linked to the second, legacy IM communication system. In embodiments this may involve the caller also having a user name or other identity within the legacy IM system and there being provided a mapping between the caller's user name or identity in the VoIP system and the user name or identity of that same caller within the legacy IM system. As the caller's VoIP account is linked to the legacy IM system, this enables the VoIP client 310 to have access to a list of contacts of the callee within the legacy IM system. The caller's VoIP client 310 may also have access to presence information for those contacts. The presence information may indicate which contacts are online or offline, or have selected to be unavailable. In embodiments the presence information may also comprise other information for use in the call flow, as will be discussed in more detail below. The user identities of the IM legacy system, the list of contacts, the mapping linking the accounts and/or the presence information may be stored at the legacy IM server system 104ii and accessed from there by the caller's VoIP client 310.

Hence at step S10 the caller's client application 310 on the first terminal 102a accesses the legacy IM server system 104ii to obtain the user name or other identifier of one or more contacts from the legacy IM system and optionally some or all of the presence information for those one or more contacts.

At step S20 the caller selects to talk to one of said one or more contacts—the callee—who is on the legacy IM system. That triggers the caller's client 310 to signal to the integration service 502 via the network 101 to generate a call request reference which is stored at least temporarily at the integration service 502, so as to be made available to the legacy IM client 320 on the callee's terminal 102b.

At step S30 the caller's client 310 also sends a first call establishment request to the legacy IM client 320 on the callee's terminal 102b. In embodiments this first call establishment request may be sent over the network 101 via the legacy IM server system 104ii, or alternatively may be sent directly over the network 101.

In embodiments the first call establishment request generated by the caller's client 310 on the caller's terminal 102a has a property of being configured to invoke the legacy IM client 320 on the callee's terminal 102b to download and/or install a supplemental VoIP application such as the plug-in 322. This may be achieved by a link contained within the first call establishment request, specifying a network address from which the callee's terminal can obtain the plug-in 322, e.g. a link specifying an address on the packet-switched network 101 such as a URL specifying an internet address (in this case vicariously via a suitable address look-up such as DNS). The link may be inserted directly by the caller's client 310 at the caller's terminal 102a, or the first call request as sent from the caller's terminal may comprise a signal causing the legacy IM server system 104ii to insert an appropriate link. In an alternative embodiment the link may not be needed if the location of the plug-in is pre-known to the callee's client 322 or terminal 102b. In another alternative no download may be required, e.g. a latent, uninstalled version of the plug-in 322 may already be stored at the callee's terminal 102b (e.g. placed there by the manufacturer), only requiring installation (e.g. comprising decompression) but not download in order to be executed on the callee's terminal 102b.

When the first call establishment request is received at the callee's terminal 102b, the invoking of the download and/or installation could be completely automated, or could comprise bringing up a prompt asking the user to manually select whether to download and/or install the VoIP plug-in 322. In the case of a manual prompt, this could be the same prompt that asks the callee whether he or she wishes to answer the call. The callee's legacy IM client 320 is configured to act on the first call establishment request accordingly.

At step S40 the callee clicks or in some other way selects the activity invoked by the first call establishment request (if the manual prompt is involved). This may open up an internal browser in IM client 310 that is logged in to the legacy IM system and has identifier information about caller and callee. Alternatively the download and/or installation could happen completely automatically with no need for manual input from the callee.

In embodiments the first call establishment request from the caller's client is also configured with a property of being configured to invoke creation of a user name or other identifier for the callee within the first, VoIP communication system, thus enabling the callee to access the VoIP communication system and thereby conduct calls (including at least with the caller). Again this invoking may be completely automated upon receipt of the first call establishment request by the callee's client 320, or via a manual user prompt presented to the callee (e.g. this may be the same prompt that asks whether to download and/or install, and/or the same prompt that asks the callee whether he or she wishes to answer the call, or alternatively would be separate prompt). The new identifier of the callee identifying the callee within the VoIP communication system may be linked to the callee's identity within the legacy IM system (e.g. via a mapping at a server such as 104i and/or 104ii). In some embodiments the new identifier may be generated and linked automatically so the callee need not see this, so he or she can continue to use the old user name or identifier for both systems with the appearance that they have become seamlessly integrated.

At step S50 the browser 324 on the callee's terminal 102b verifies the call request reference with the integration service 502. In alternative embodiments step of verifying the reference with an integration service 502 may be omitted, and/or alternative verification arrangements may be put in place.

At step S60 the VoIP plug-in 322 is installed at the callee's terminal 102b, assuming any required verification is positive.

At step S70 the plug-in 322 starts a call back to the caller's VoIP client 310 on the caller's terminal 102b using the standard VoIP call infrastructure 502. The call back comprises not return of a call acceptance response of the call set up protocol, but another call establishment request of the call set up protocol sent back from the newly installed VoIP client 322. In embodiments the plug-in 322 is able to send the request to the caller's terminal 102a based on a user name or other identifier identifying the caller within the first communication system, which the plug-in 322 may have obtained from one of the previous steps, e.g. contained in the first call set-up request at S30 or obtained from the reference provided via steps S20 and S50. The plug-in 322 may then find the network address of the caller on the packet-switched network 101, e.g. IP address, based on an address look up using the caller's user name or identifier within the first, VoIP communication system and the call infrastructure 504 which may map user names to addresses. This call back may again be completely automated or may involve a manual prompt asking the callee to confirm. In the case of a manual prompt, this could be the same prompt that downloads and/or installs the plug-in 322, creates the new user name, and/or that ask the callee whether he or she wishes to answer the call, or alternatively could be a separate prompt.

Thus the client engine 314 of the VoIP client 310 on the caller's terminal 102a receives back from the plug-in 322 on the callee's terminal 102b a reverse call establishment request, which the client engine 314 will then have to accept in order to complete the call set-up. According to embodiments of the disclosure herein, the client engine 314 comprises a timer 317 and, using the timer 317, is configured to automatically accept the call specified in the reverse call establishment request on condition that it is received back from the callee's terminal 102b within a predetermined time limit. If and when accepted, the client engine 314 of the caller's client 310 then automatically sends a call acceptance response to the plug-in 322 on the callee's terminal 102b and the call is thus established. Each of the VoIP clients 310 and 322 may be arranged to output an indication to this effect to the caller and callee respectively. The call then proceeds via the relevant I/O devices 208, 210 212 and/or 214.

In embodiments the session for the call may be set up at the same time as the call, i.e. the session establishment request and acceptance response are exchanged along with the reverse call establishment request and call acceptance response respectively.

While the process is happening, e.g. while waiting for the callee's terminal 102b to download and install the plug-in 322, in embodiments the caller's client 310 displays the same outgoing call ("ringing") message or indication that it would for a more conventional outgoing call that did not involve the reverse call establishment process. Because the process is also automated at the caller's end, the process can thus be completely hidden from the caller who need know the call is any different from any other call. For example the caller need not know that the callee is downloading or installing a new client 322 or creating a new user name, and to the caller the system just gives the appearance that he or she is simply waiting for the callee to answer a normal call.

The predetermined time limit runs from instigation of the call flow by the caller or his or her VoIP client 310, e.g. from the caller selecting a control in the user interface of the client 310 or from the generation or transmission of the first call establishment request by the client 310, or from another suitable point in time related to such events. The predetermined time limit may be fixed or may be a setting set by the caller or provider of the first, VoIP commination system, e.g. set via an interface of the client 310. In embodiments the time limit is between 30 seconds and 90 seconds, this representing a typical range of user patience. In one particular embodiment the time limit is 60 seconds.

So in a situation where another incoming call request is received back at the originating near-end terminal because the far-end is not ready and the original request cannot be responded to with a simple acceptance, then the second call request is automatically accepted by the near-end terminal if it arrives within a certain time window, as part of the same call flow. I.e. the originating caller will automatically accept the call back request if it is received within a predetermined time, thus appearing to the originating user to be part of a single call set up.

Otherwise, if the reverse call establishment is not received back within the time limit, the client engine of the caller's client 310 times out a call and the attempt to establish a call fails. The caller's client 310 may be arranged to present the caller with a message or other indication to this effect. In embodiments it may simply appear to the caller that the callee has not answered the call.

As noted above, in embodiments the client engine 314 of the VoIP client 310 on the caller's terminal 102a has access to presence information of the callee's terminal 102b. This may comprise information as to whether the callee's terminal 102b is currently ready to accept calls. Alternatively or additionally the presence information may comprise a flag indicating whether the second, legacy IM client 320 on the callee's terminal 102b supports a process of the kind discussed above based on a reverse call establishment—e.g. whether it is able to act upon a link to a plug-in 322 or other such invocation in the first call establishment request or whether such a link or invocation would not be recognised.

Using such presence information, the client engine 314 of the client 310 on the caller's terminal may be configured to adapt its behaviour accordingly. For instance if it determines from the presence information that the callee side does support the relevant process, it may send an instance of the first call establishment request of the kind discussed above which invokes download and/or installation of the plug-in 322 at the callee's terminal 102b. On the other hand if the caller's client 310 determines from the presence that such a process is not supported, or that such a process is not needed because the callee's terminal 102b is already in a position to accept the call (e.g. is already installed with a suitable VoIP client), then the caller's client 310 may instead send a call establishment request of a more conventional kind.

In yet further alternative or additional embodiments, if the caller's client 310 determines from the presence information that the call back process is supported and/or the callee's terminal is unready when the first request is sent, it can adapt its state accordingly—i.e. when it receives a message back from the callee's terminal 102b it knows to apply the automated acceptance process including applying the timing condition. On the other hand if the caller's client 310 determines from the presence that the callee's terminal is ready when the first request is sent (e.g. is already installed with a suitable VoIP client), it knows not to apply any automated acceptance process or any time condition when a message is received back from the callee's terminal 102b.

It will be appreciated that the above embodiments have been described only by way of example.

For instance, the disclosure is not limited to a case where the callee's client is unready to accept the call because it is not installed with eth appropriate voice or video calling client application. In another scenario, even if the caller and callee have instances of the client of the same communication system installed on their respective user terminals, e.g. both have compatible VoIP clients, the caller may attempt to call while the callee's client is in background state and unable to immediately take the call. The operating system, under the control of which an application such as a communication client is run, may place the application into a background state whereby it is suspended from execution or allocated only a supressed number of processing cycles compared to a foreground state. In this state, the commination client may not have access to a network port meaning it cannot listen for incoming call establishment requests, or may not have the resources to process incoming call establishment requests.

Hence in other embodiments the callee's terminal may already be installed with a full instance of the voice or video client (e.g. VoIP client) but this client application may be unable to accept the call at the time of the first call establishment request due to being placed into a background state whereby it is suspended or scheduled a limited number of processor cycles compared to a foreground state, typically being placed in this state by the operating system on which it is run. For example the callee's client may be suspended or suppressed in favour of another application such as a full-screen application, e.g. a video game, or while the callee's terminal is powered down into a standby mode. In such scenarios the callee's client will have to wake-up before it can accept the call. In embodiments, the first call establishment request induces the callee's voice or video calling client to wake up from the background state and in response the callee's client sends back the reverse call establishment request to the originating client on the caller's terminal.

In such embodiments, the first call establishment request may be delivered in a payload of a push notification via a push notification service of the operating system, or may at least involve use of a push notification of the push notification service to wake up the callee's client. The push notification service is a network element provided by or supported by the provider of an operating system which, when a push notification request is sent to it by another element such as the caller's client, generates a push notification to the target operating system triggering a backgrounded application to be woken up. In some cases the push notification service may support augmented push notifications with a payload that can be delivered to the application upon wake up. Alternatively the first call establishment request may be delivered via a server 104*i* or 104*ii* if the backgrounded client is still allocated a network port and sufficient resources to listen for requests.

In another variant the callee has a voice or video calling client of the first communication system installed, e.g. VoIP client, but is not logged in with that client, e.g. only being logged in with a client of a second communication system such as an IM system instead. In that case the reverse call establishment message may be sent once the callee logs in. The first call establishment message may trigger the callee's terminal to prompt the callee to log in.

Further, the above has been described in terms of the automated acceptance process being implemented at the client 310 of the caller's terminal 102*a*. However in alternative embodiments it could be implemented at an intermediate network element such as one or more of the servers 104*i* and/or 104*ii* of one or more communication systems. In such alternatives the intermediate server receives the first call establishment request from the caller's terminal, forwards it to the callee's terminal, receives the reverse call establishment request back at the server and applies the time condition and automated acceptance there. If received within the time limit, this intermediate server completes the call set up by sending respective instances of the call acceptance response to both the caller's and the callee's terminals.

In further embodiments, the second communication system is not necessarily IM only, e.g. the callee's terminal could have a client of a legacy VoIP that is incompatible with the first system. Also in embodiments, "only" IM may mean to the exclusion of VoIP and need not exclude other forms of communication such as file transfer (though to the exclusion of all other forms of communication between users is also a possibility).

The integration service 502 has been described above as part of the infrastructure of the first, VoIP communication system, but in alternative embodiments the integration service 502 (if present) may be considered part of the second, legacy IM system's infrastructure, or may be shared between the two systems' infrastructures or even provided by a third party.

Further, sending a message such as a call establishment request or call acceptance response between nodes A and B, e.g. between user terminals or between server and user terminal, does not mean the form of the message cannot be modified or translated between those nodes as long as underlying meaning or function of the message is conveyed.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user terminals may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A system comprising:
one or more hardware processors; and
a memory comprising instructions that when executed by the one or more hardware processors, configure the one or more hardware processors to establish a call between a caller terminal and a called terminal where a client application to accept the call is not installed on the called terminal when the called terminal receives a call establishment request, by performing operations including:
receiving, by the called terminal, the call establishment request from the caller terminal to establish the call between the caller terminal and the called terminal, the call establishment request indicating an initiation of the establishment of the call at the caller terminal;
in response to receiving the call establishment request:
presenting a single prompt that requests whether a user wishes to answer the call request, and to allow installing of the client application in order to accept the call, based on selection of the single prompt, installing the client application, sending, via the installed client application, a reverse call establishment request to the caller terminal in response to a completion of the installing of the client application and the reception of the call establishment request from the caller terminal, the reverse call establishment request configured to cause the caller terminal to accept the reverse call establishment request, wherein the installation of the client application on the called terminal occurs during the establishment of the call at the caller terminal; and receiving a call acceptance response to establish the call using a packet-switched network, the call acceptance response indicating a completion of the establishment of the call at the caller terminal.

2. The system of claim 1, wherein the prompt includes a link to a network location for the download of the client application.

3. The system of claim 1, wherein the system is configured to receive the call establishment request with an instant messaging application different than the client application, and wherein the instant messaging application initiates the download or the installation of the client application.

4. The system of claim 1, wherein the operations further include providing an indication that the called terminal supports use of the reverse call establishment message, and wherein the indication is included in presence information associated with contact information of the called terminal.

5. The system of claim 4, wherein the presence information indicates whether the called terminal is ready to accept the call.

6. The system of claim 5, wherein the presence information indicates that the client application for conducting the call is not installed at the called terminal.

7. The system of claim 1, wherein the call and the call flow comprising the call establishment request, the reverse call establishment request, and the call acceptance response are conducted over the packet-switched network.

8. The system of claim 1 wherein the reverse call establishment request is configured to cause the caller terminal to accept the reverse call establishment request if it is received within a defined period of time from the call establishment request.

9. The system of claim 1, further comprising determining whether the client application is installed on the called terminal, wherein the performing is in response to the determination.

10. A method to establish a call between a caller terminal and a called terminal, the method comprising:

receiving, by the called terminal, a call establishment request from the caller terminal to establish a call with the called terminal, the call establishment request indicating an initiation of the establishment of the call at the caller terminal, wherein an application to accept the call is not installed on the called terminal when the called terminal receives the call establishment request;

in response to the receiving the call establishment request:

presenting a prompt that requests whether a user wishes to answer the call request, and to allow installing the application in order to accept the call, based on selection of the prompt, installing the application on the called terminal, and sending, via the installed application, a reverse call establishment request for the call to the caller terminal, in response to a completion of the installing of the application and the reception of the call establishment request from the caller terminal, the reverse call establishment request configured to cause the caller terminal to accept the reverse call establishment request on behalf of the caller, wherein the installation of the application on the called terminal occurs during the establishment of the call at the caller terminal; and receiving a call acceptance response to establish the call, the call acceptance response indicating a completion of the establishment of the call at the caller terminal.

11. The method of claim 10, wherein the prompt includes a link to a network location for downloading the application.

12. The method of claim 10, wherein an instant messaging client application initiates the installing of the application.

13. A user terminal comprising:

one or more hardware processors; and a memory comprising instructions, executable by the one or more hardware processors, to configure the user terminal to establish a call between a caller terminal and the user terminal where a client application to accept the call is not installed on the user terminal when the user terminal receiving a call establishment request, by performing operations including:

receiving, by the user terminal, the call establishment request to establish the call between the caller terminal and the user terminal and indicating an initiation of the establishment of the call at the caller terminal;

in response to receiving the call establishment request:

presenting a single prompt that requests whether a user wishes to answer the call request, and to allow installing the client application, based on selection of the single prompt, installing the client application on the user terminal, sending, via the installed client application, a reverse call establishment request to the caller terminal in response to a completion of the installing of the client application and the reception of the call establishment request from the caller terminal the reverse call establishment request configured to cause the caller terminal to accept the reverse call establishment request, wherein the installation of the client application on the user terminal occurs during the establishment of the call at the caller terminal, and receiving a call acceptance response to establish the call between the user terminal and the caller terminal over a packet-switched network, the call acceptance response indicating a completion of the establishment of the call at the caller terminal.

14. The system of claim 1, wherein the single prompt is presented by a different application that is different than the client application.

15. The method of claim 10, further comprising providing an indication to the caller terminal that the called terminal supports use of a process that includes the reverse call establishment request.

16. The method of claim 10, further comprising providing an indication to the caller terminal that the called terminal supports use of a process that includes the reverse call establishment request, the indication being included as part of presence information associated with the called terminal.

17. A system comprising:

one or more hardware processors; and one or more computer-readable storage media storing instructions that are executable by the one or more hardware processors to perform operations to establish a call between a caller terminal and a called terminal where a client application to accept the call is not installed on the called terminal when the called terminal receives a call establishment request, the operations including:

receiving, at the called terminal, the call establishment request initiated by a client application executed by a caller terminal to establish a call between the caller terminal and a called terminal, the call establishment request indicating an initiation of the establishment of the call at the caller terminal;

in response to receiving the call establishment request, performing operations at the called terminal including:

installing the client application on the called terminal, sending, automatically and independent of user input at the called terminal, and via the client application executing by the called terminal, a reverse call establishment request to the caller terminal in response to a completion of the installing of the client application and the reception of the call establishment request from the caller terminal, the reverse call establishment request configured to cause the caller terminal to accept the reverse call establishment request on behalf of the caller, wherein the installation of the client application on the called terminal occurs during the establishment of the call at the caller terminal and receiving a call acceptance response to establish the call between the caller terminal and the called terminal, the call acceptance response indicating a completion of the establishment of the call at the caller terminal.

18. A system as recited in claim 17, wherein the operations further include automatically logging in to the client application.

19. A system as recited in claim 17, wherein the operations further include providing an indication to the caller terminal that the called terminal supports use of a process the includes the reverse call establishment request, the indication being included as part of presence information associated with the called terminal.

20. A method to establish a call between a caller terminal and a called terminal, the method comprising:

receiving, by the called terminal, a call establishment request initiated by the client application executed by the caller terminal to establish the call between the caller terminal and the called terminal, wherein the client application to accept the call is not installed on the called terminal when the called terminal receives the call establishment request;

in response to receiving the call establishment request at the called terminal, performing operations at the called terminal including:

installing the client application on the called terminal, sending, automatically and independent of user input at the called terminal, and via the client application executing by the called terminal, a reverse call establishment request to the caller terminal in response to a completion of the installing of the client application on the called terminal and the reception of the call establishment request from the caller terminal, the reverse call establishment request configured to cause the caller terminal to accept the reverse call establishment request on behalf of the caller, wherein the installation of the client application on the called terminal occurs during the establishment of the call at the caller terminal, and receiving a call acceptance response to complete establishment of the call between the caller terminal and the called terminal, the call acceptance response indicating the completion of the establishment of the call at the caller terminal.

21. A method as recited in claim 20, wherein the operations further include automatically logging in to the client application.

22. A method as recited in claim 20, further comprising providing an indication to the caller terminal that the called terminal supports use of a process the includes the reverse call establishment request, the indication being included as part of presence information associated with the called terminal.

* * * * *